Figure 1:
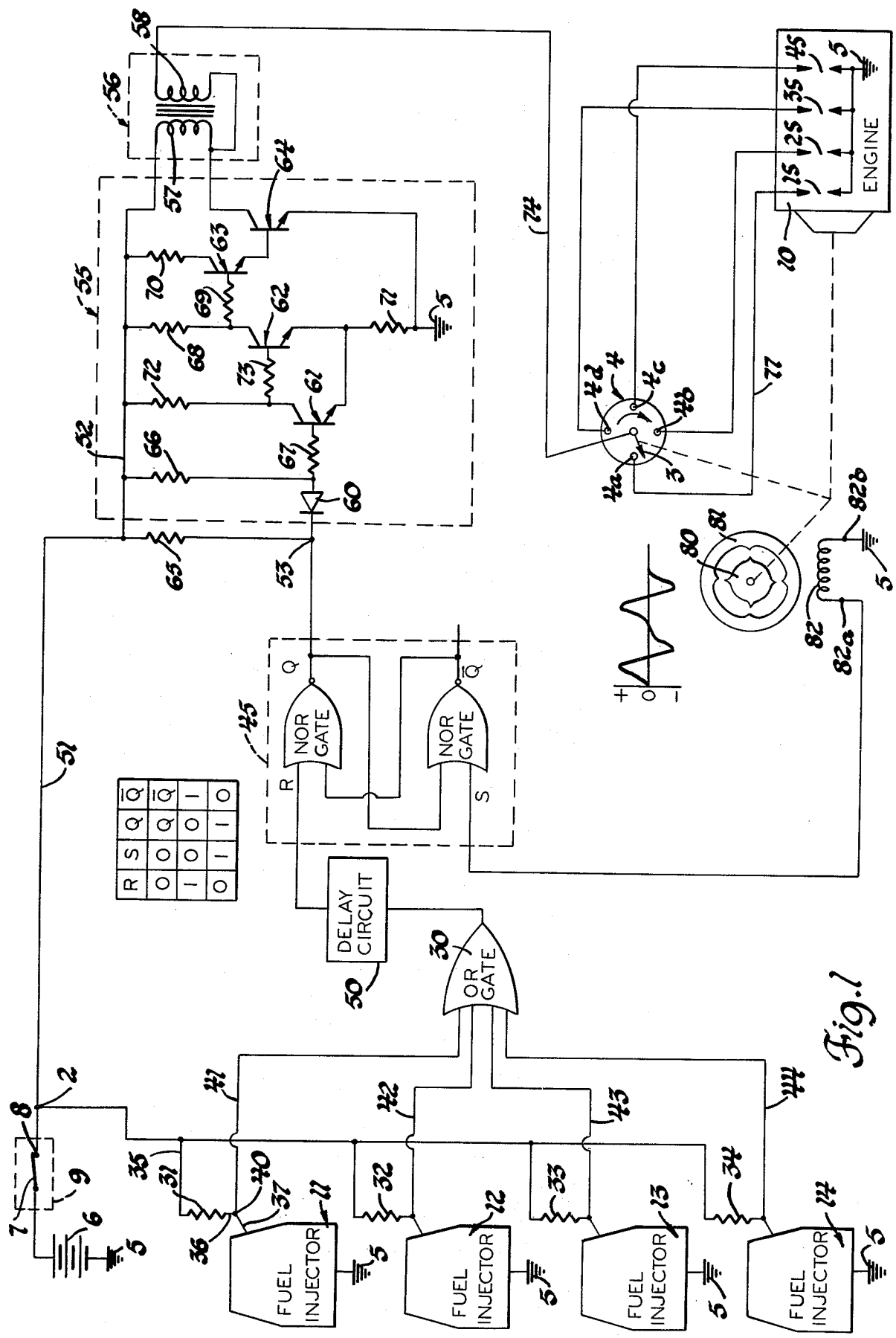

United States Patent [19]

Casey

[11] 4,111,178

[45] Sep. 5, 1978

[54] IGNITION SYSTEM FOR USE WITH FUEL INJECTED-SPARK IGNITED INTERNAL COMBUSTION ENGINES

[75] Inventor: Gary L. Casey, Troy, Mich.

[73] Assignee: General Motors Corporation, Detroit, Mich.

[21] Appl. No.: 739,563

[22] Filed: Nov. 8, 1976

[51] Int. Cl.² .................... F02B 3/00; F02P 5/04
[52] U.S. Cl. .................... 123/32 SA; 123/32 AE; 123/148 E; 123/152
[58] Field of Search ........ 123/148 R, 146 SA, 148 E, 123/32 AE, 32 EA, 117 R, 32 SJ, 148 ND, 32 SA, 151, 152, 156, 163

[56] References Cited

U.S. PATENT DOCUMENTS

| | | | |
|---|---|---|---|
| 2,403,440 | 7/1946 | Jansson | 123/32 AE |
| 2,436,090 | 2/1948 | Bodine, Jr. | 123/32 AE |
| 2,718,883 | 9/1955 | Taylor | 123/148 E |
| 2,795,214 | 6/1957 | Shook | 123/32 SJ |
| 2,950,706 | 8/1960 | Senckel | 123/32 AE |
| 2,960,973 | 11/1960 | Davis | 123/32 AE |
| 3,186,386 | 6/1965 | Papst | 123/32 SJ |
| 4,066,059 | 1/1978 | Mayer et al. | 123/32 AE X |

Primary Examiner—Charles J. Myhre
Assistant Examiner—Tony M. Argenbright
Attorney, Agent, or Firm—Richard G. Stahr

[57] ABSTRACT

The valve seat and cooperating movable valve member of each fuel injector of an associated fuel injected-spark ignited internal combustion engine are connected in series with a resistor across a direct current potential source. The valve seat and movable valve member provide a pair of normally closed electrical contacts which are operated to the electrical circuit open condition upon the initiation of actuation of the movable valve member to inject fuel. Upon each operation of these normally closed electrical contacts to the electrical circuit open condition, an electrical signal is produced thereacross and applied to an associated electronic ignition system which, in response thereto, produces an ignition spark-creating potential. Each ignition spark initiating potential is directed to the spark plug of the engine cylinder into which fuel is being injected by the actuated fuel injector.

4 Claims, 3 Drawing Figures

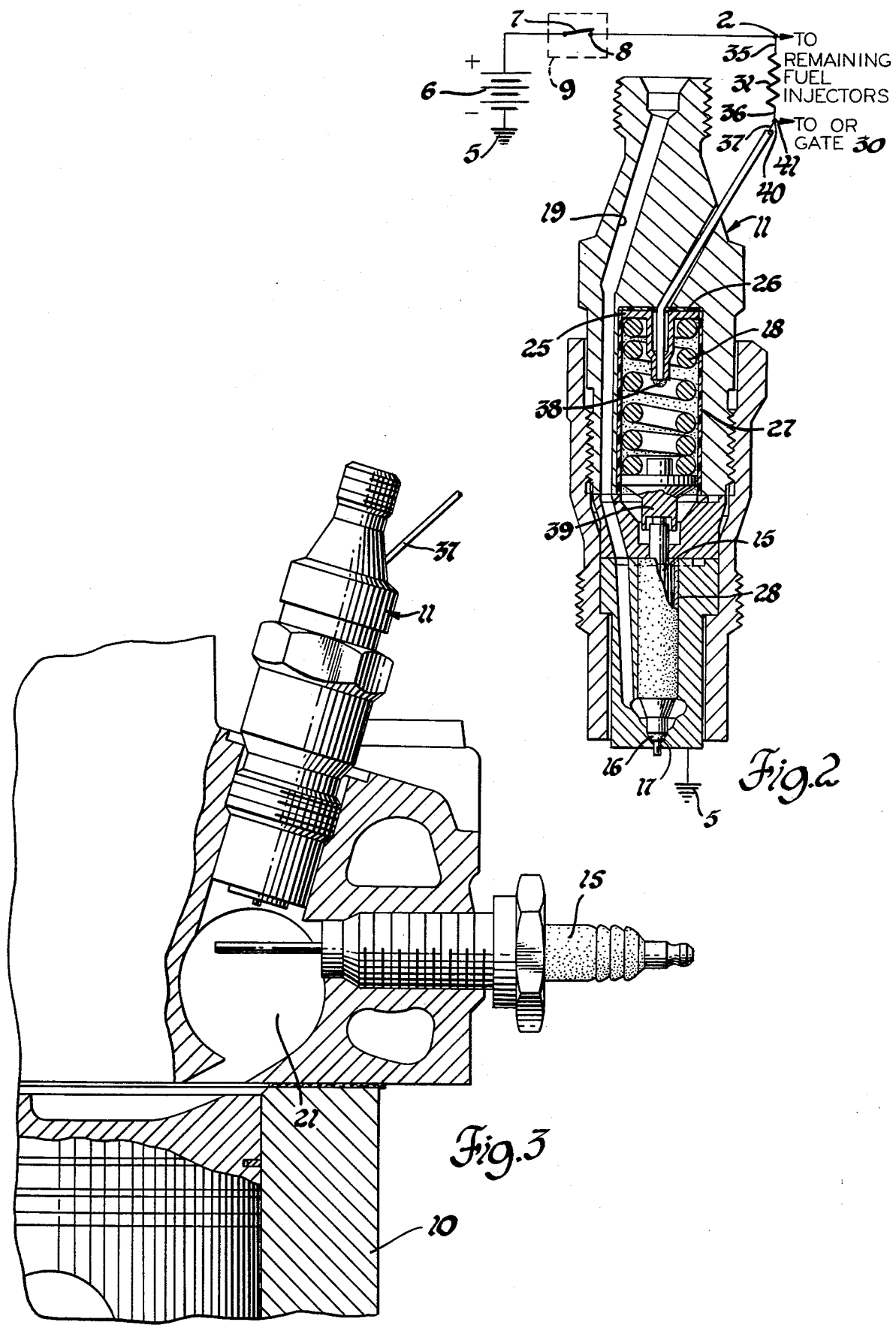

IGNITION SYSTEM FOR USE WITH FUEL INJECTED-SPARK IGNITED INTERNAL COMBUSTION ENGINES

This invention is directed to an ignition system for use with fuel injected-spark ignited internal combustion engines and, more specifically, to an ignition system for use with fuel injected-spark ignited internal combustion engines which initiates an ignition spark in response to an electrical signal produced upon the initiation of operation of the movable valve member of each fuel injector away from the corresponding valve seat to inject fuel.

In the prior art, internal combustion engines of the type having fuel injection and spark ignition employed separate fuel injection timing and spark ignition timing controls. Although the control system for each of these functions was referenced to engine crankshaft position, they operated independently in all other respects. Engines of the fuel injected-spark ignited type have been at best only moderately successful because of the extreme difficulty encountered in providing a satisfactory timed relationship between the fuel injection and spark ignition events.

Specifically, a significant reduction in weight and attendant cost of Diesel cycle internal combustion engines may be realized with the substitution of spark ignition for the conventional combustion ignition process. A conventional Diesel cycle engine requires glow plugs for starting and is noisier than a comparable gasoline engine. This characteristic is due to the auto ignition requirements of the fuel as very high compression ratios are used to heat the fuel-air mixture to a temperature sufficient for spontaneous ignition. When spontaneous ignition occurs, a substantial portion of the fuel-air mixture may burn at once which results in the characteristic Diesel cycle engine "knock". If a spark plug is employed as an ignition device, several advantages are apparent. The compression ratio would be determined only by the thermal efficiency desired instead of the cold starting requirement; the characteristic Diesel cycle engine "knock" would be eliminated as a result of the reduced ignition delay and cold starts may be accomplished without the glow plug warmup delay. Spark ignited Diesel cycle engines have been developed; however, the problem which prevents production application of these engines is the requirement of very precise ignition spark timing relative to the fuel injection event. The ignition spark must occur at substantially the exact instant the first combustion fuel is injected into the vicinity of the spark plug. Therefore, an ignition system for use with direct fuel injected-spark ignited internal combustion engines which provides for the creation of an ignition spark at substantially the precise moment the injected fuel arrives in the vicinity of the spark plug is desirable.

It is, therefore, an object of this invention to provide an improved ignition system for use with spark ignited internal combustion engines.

It is another object of this invention to provide an improved ignition system for use with fuel injected-spark ignited internal combustion engines.

It is an additional object of this invention to provide an improved ignition system for use with fuel injected-spark ignited internal combustion engines which produces an ignition spark at substantially the precise instant the injected fuel arrives in the vicinity of the spark plug.

In accordance with this invention, an ignition system for a fuel injected-spark ignited internal combustion engine is provided wherein an electronic type ignition system produces an ignition spark-creating voltage in response to an electrical signal produced when an electrical circuit is interrupted upon the initiation of actuation of the movable valve member of each fuel injector away from the cooperating valve seat to inject fuel into the combustion chamber of the corresponding engine cylinder and the ignition spark-creating voltage is directed to the charge igniting device of the cylinder into which the fuel is being injected.

For a better understanding of the present invention, together with additional objects, advantages and features thereof, reference is made to the following description and accompanying drawing in which:

FIG. 1 sets forth the ignition system of this invention partially in schematic and partially in block form;

FIG. 2 is a section view of a fuel injector unit suitable for use with the ignition system of this invention; and FIG. 3 is a cutaway view partially in section of a typical cylinder of a fuel injected-spark ignited internal combustion engine with which the ignition system of this invention may be employed.

As point of reference or ground potential is the same point electrically throughout the system, it has been represented in the drawing by the accepted schematic symbol and referenced by the numeral 5.

In FIG. 1 of the drawing, the ignition system of this invention for use with fuel injected-spark ignited internal combustion engines is set forth in schematic form in combination with a direct current potential source, which may be a conventional automotive type storage battery 6, and an ignition distributor 4 having a movable electrical contact 3, rotated in timed relationship with an associated fuel injected-spark ignited internal combustion engine 10, through which ignition spark energy is directed to the spark plugs of the engine individually in sequence, in a manner well known in the art.

The fuel injected-spark ignited internal combustion engine with which the ignition system of this invention may be used is set forth in block form, is referenced by the numeral 10 and is illustrated as having four spark plugs 1S, 2S, 3S and 4S, each having an arc gap as is well known in the art. It is to be specifically understood, however, that the ignition system of this invention may be used with internal combustion engines having more or less cylinders.

To supply operating potential to the system, movable contact 7 of an electrical switch 9 may be closed to stationary contact 8 to supply battery 6 potential across junction 2 and point of reference or ground potential 5. Movable contact 7 and stationary contact 8 of FIGS. 1 and 2 may be the normally open ignition system energizing circuit electrical contacts of a conventional automotive ignition switch of a type well known in the art. The normally open ignition system energizing circuit electrical contacts of an automotive type ignition switch are operated to the electrical circuit closed condition while the associated engine is in the "Crank" mode or in the "Run" mode, as is well known in the art. For purposes of this specification, it will be assumed that movable contact 7 is closed to electrical contact with stationary contact 8.

Corresponding to each cylinder of the associated engine 10 is a fuel injector having a movable member for injecting fuel into the combustion chamber of the cylinder to which it corresponds upon the actuation of the movable member. In FIG. 1, the fuel injectors are illustrated in block form and are referenced by the numerals 11, 12, 13 and 14 which correspond, respectively, to the first, second, third and fourth cylinders of engine 10.

An elevation view in section of a typical fuel pressure actuated fuel injector suitable for use with the ignition system of this invention is set forth in FIG. 2. The movable member 15 of the fuel injector is of an electrically conductive material and has a movable valve member 16 which is normally maintained in a closed position against an accommodating valve seat 17 by the force of a helical compression spring 18 also of an electrically conductive material, as is well-known in the fuel injector art. Although the fuel injector detailed in FIG. 2 is of the fuel pressure actuated type, it is to be specifically understood that either cam or solenoid actuated fuel injector types may be employed without departing from the spirit of this invention. When fuel is to be injected into the corresponding engine cylinder, the associated injector fuel pump, not shown, delivers fuel through internal fuel passage 19 under sufficient pressure to operate movable valve member 16 of movable member 15 away from the accommodating valve seat 17 against the force of helical compression spring 18 in a manner well-known in the fuel injector art. Upon the actuation of movable member 15 for injecting fuel into the combustion chamber 21, FIG. 3, the fuel is injected into the vicinity of the firing electrodes of spark plug 1S.

An electrical circuit including at least the source of direct current potential, battery 6, and the pair of normally closed electrical contacts provided by movable valve member 16 and accommodating valve seat 17 in series corresponding to each fuel injector for producing an electrical signal of a selected polarity upon the operation of the pair of normally closed electrical contacts to the electrical circuit open condition upon the injection of fuel into the cylinder of the engine to which the injector corresponds is provided. The compression spring 18 retainer member 25 of an electrically conductive material is insulated from the main body portion of the fuel injector unit by an insulating washer 26 of mica or a similar good electrical insulating material; electrically conductive compression spring 18 is insulated from the main body portion of the fuel injector unit by a sleeve or tube 27 of a good insulating material such as that commercially marketed under the trademark "Teflon" and electrically conductive movable member 15 is insulated from the main body portion of the fuel injector unit by a thin layer of insulating material 28 completely covering the outer cylindrical surface thereof. This insulating layer 28 is shown in section in the cutaway portion of FIG. 2. In the preferred embodiment, the thin layer of insulating material 28 was a ceramic insulating film of a thickness of one-one hundred thousandths of an inch (0.00001 inch). Alternatively, the thin insulating layer 28 may be made up of aluminum oxide sputtered upon and completely covering the cylindrical surface of movable member 15 in a manner well-known in the art. With this arrangement, therefore, the electrically conductive movable member 15, electrically conductive compression spring 18 and electrically conductive compression spring retainer member 25 are electrically insulated from the main body portion of the fuel injector unit which is connected to point of reference or ground potential 5 through the engine cylinder block when installed in the engine as shown in FIG. 3. A resistor corresponding to each fuel injector, referenced in FIG. 1 by the numerals 31, 32, 33 and 34, are provided and each is connected into an electrical circuit for the corresponding fuel injector which includes the series combination of the pair of normally closed electrical contacts provided by movable valve member 16 and accommodating valve seat 17 of the corresponding fuel injector unit and source of direct current potential 6. Referring to FIG. 2, this electrical circuit for fuel injector 11 may be traced from the positive polarity terminal of battery 6, through the contacts 7 and 8 of ignition switch 9 when operated to the electrical circuit closed condition, lead 35, resistor 31, leads 36 and 37, solder connection 38 through which lead 37 is electrically connected to compression spring 18 retainer member 25, through retainer member 25, compression spring 18, electrically conductive actuating member 39, movable member 15, normally closed electrical contacts provided by movable valve member 16 and accommodating valve seat 17 and point of reference or ground potential 5 to the negative polarity terminal of battery 6. While the normally closed electrical contacts are in the normally closed condition, substantially ground potential appears across junction 40 and point of reference or ground potential 5 and when the normally closed electrical contacts are operated to the electrical circuit open condition upon the operation of movable member 15 to inject fuel into the corresponding cylinder of engine 10, a direct current electrical signal of a magnitude substantially equal to the potential of battery 6 appears across junction 40 and point of reference or ground potential 5 and is of a positive polarity upon junction 40 with respect to point of reference or ground potential 5.

Referring to FIG 1, the output leads 41, 42, 43 and 44 of the electrical circuit just described corresponding to each of respective fuel injectors 11, 12, 13 and 14 are applied to respective input terminals of a conventional four input OR gate 30 of a type well-known in the art. Upon the occurrence of a positive polarity logic 1 output signal upon any one of output circuit leads 41, 42, 43 or 44, OR gate 30 produces a positive polarity logic 1 output signal which is applied to the input terminal of a conventional electrical signal delay circuit 50 which may be any of the delay circuits well known in the art.

With regard to delay circuit 50, engine 10 requires an ignition spark at essentially the exact instant the first combustible fuel-air mixture is present. This combustible mixture occurs not at the instant of fuel injector opening but at a later time. This time delay has been found to be substantially constant with speed and load, consequently, to produce the ignition spark at the precise time a combustible mixture is present, a fixed time delay of 0.4 to 0.6 milliseconds must be inserted between OR gate 30 and the ignition coil control. Electrical signal delay circuit 50 provides this fixed time delay period. In the preferred embodiment, this delay period was 0.6 milliseconds.

To produce an ignition spark-creating voltage in response to each electrical signal produced in a manner previously described upon the operation of the movable member of the fuel injector corresponding to the cylinder into which fuel is to be injected, a conventional electronic ignition system 55 and a conventional ignition coil 56 having a primary winding 57 and a secondary winding 58 may be employed. In a manner to be later explained, electronic ignition system 55 is responsive to each electrical signal produced in a manner hereinbefore explained to interrupt the ignition coil 56 primary winding 57 energizing circuit. Upon the interruption of this energizing circuit, an ignition spark-creating voltage is induced in secondary winding 58 and this ignition spark-creating voltage is directed to the spark igniting device of the cylinder of engine 10 into which fuel is being injected by conventional ignition distributor 4 in a manner well-known in the automotive art.

To prevent spurious operation of conventional electronic ignition system 55 in response to movable member 15 bounce or secondary injections which may be caused by pressure wave reflections in the fuel supply system, the provision of a latch circuit between OR gate 30 and electronic ignition system 55 may be desirable. Without intention or inference of a limitation thereto, this latch circuit may be a conventional NOR gate R-S flip-flop circuit 45 of a type well known in the art which obeys the truth table set forth in FIG. 1.

To interrupt and complete the ignition coil primary winding 57 energizing circuit, the current carrying elements of an electrical switching device which are operable to the electrical circuit open and closed conditions, are connected in series therein. This electrical switching device may be an NPN switching transistor 64 included in electronic ignition system 55. The current carrying elements of switching transistor 64, the collector-emitter electrodes, are operable to the electrical circuit open and closed conditions in response to electrical signals applied to the control electrodes thereof, the base electrode, and are connected in series in the ignition coil primary winding 57 energizing circuit. The ignition coil primary winding 57 energizing circuit may be traced from the positive polarity terminal of battery 6, through the closed contacts of electrical switch 9, positive polarity potential leads 51 and 52, primary winding 57, the collector-emitter electrodes of switching transistor 64 and point of reference or ground potential 5 to the negative polarity terminal of battery 6. The collector-emitter electrodes of switching transistor 64 are operated to the electrical circuit open condition at the time each spark plug of engine 10 is to be fired in response to each of the electrical signals produced in a manner hereinabove explained.

In a practical ignition system, it is necessary that the ignition coil primary winding energizing circuit be completed for a period of time just long enough for the energizing current flow therethrough to reach a predetermined value before the energizing circuit is next interrupted. In the art, the period of time the ignition coil primary winding is energized is referred to as the "dwell" time. One method for providing the proper ignition coil primary winding dwell time is to produce a series of electrical signals in timed relationship with engine 10 by any one of the several conventional magnetic distributors well known in the automotive art. One example of a magnetic distributor well known in the automotive art suitable for use with the ignition system of this invention is of the variable reluctance type disclosed and described in U.S. Pat. No. 3,254,247, Falge, which issued May 31, 1966 and is assigned to the same assignee as is the present invention. In the interest of reducing drawing complexity, the variable reluctance type ignition distributor disclosed and described in the aforementioned patent is set forth in schematic form in FIG. 1 of the drawing. A rotor member 80 is rotated in timed relationship with the engine by the engine in a manner well known in the art within the bore of pole piece 81. Equally spaced about the outer periphery of rotor 80 and about the bore of pole piece 81 are a series of projections equal in number to the number of cylinders of the engine with which the distributor and ignition system are being used. As each projection of rotor 80 approaches a projection on pole piece 81, the reluctance of the magnetic circuit between rotor 80 and pole piece 81 decreases and as each projection on rotor 80 moves away from the projection on pole piece 81, the reluctance of the magnetic circuit between rotor 80 and pole piece 81 increases. Consequently, the magnetic field produced by the distributor permanent magnet, not shown, increases and decreases as each projection on rotor 80 approaches and passes a projection on pole piece 81, a condition which induces a series of alternating current signal cycles in pickup coil 82, magnetically coupled to pole piece 81, of a wave form shown in the drawing above the rotor and pole piece assembly. Ignition distributor 4 is adjusted, in a manner well known in the art, relative to engine crankshaft position such that the positive polarity excursion of each cycle of the series of signal cycles induced in pickup coil 82 begins at a time which will initiate ignition coil primary winding dwell at the proper time in a manner to be later explained.

The series of signal cycles induced in pickup coil 82 is applied to the "S" input terminal of RS flip-flop circuit 45 and the output signals of delay circuit 50 are applied to the "R" input terminal of RS flip-flop circuit 45.

With movable contact 7 of switch 9 closed in electrical contact with stationary contact 8 while engine 10 is the the "Run" mode, the potential of battery 6 appears across positive polarity potential leads 51 and 52 and point of reference or ground potential 5. Upon the occurrence of the next positive polarity excursion of the series of signal cycles induced in pickup coil 82 when terminal end 82a thereof is positive with respect to terminal end 82b, this logic 1 signal is applied to the "S" input terminal of RS flip-flop circuit 45. As a logic 0 signal is present upon the "R" input terminal at this time, a logic 1 signal appears upon the "Q" output terminal of RS flip-flop circuit 45. Consequently, the potential upon junction 53 with respect to point of reference or ground potential 5 is substantially equal to the output potential of battery 6. With a positive polarity potential of a magnitude substantially equal to the operating potential of battery 6 upon junction 53, diode 60 is reverse biased as substantially the same potential is applied to the anode and the cathode electrodes thereof through respective resistors 65 and 66. With diode 60 reverse biased, base-emitter drive current is supplied to NPN transistor 61 through resistors 66 and 67. While base-emitter drive current is supplied to NPN transistor 61, this device conducts through the collector-emitter electrodes thereof to divert base-emitter drive current from NPN transistor 62, consequently, transistor 62 is not conductive through the collector-emitter electrodes thereof. While transistor 62 is not conductive, base-emitter drive current is supplied to NPN transistor 63 through resistors 68 and 69, consequently, transistor 63 conducts through the collector-emitter electrodes thereof. While transistor 63 is conductive through the collector-emitter electrodes, base-emitter drive current is supplied to NPN switching transistor 64 through resistor 70 and the collector-emitter electrodes of conductive transistor 63. While base-emitter drive current is supplied to switching transistor 64, this device conducts through the collector-emitter electrodes to complete the ignition coil primary winding 57 energizing circuit previously described. Resistor 71 provides a reverse bias upon the emitter electrode of transistor 62 when transistor 61 is triggered conductive to provide a sharper cutoff thereof upon the conduction of transistor 61.

Assuming for the purposes of this specification that the next cylinder of engine 10 to be fired is cylinder No. 1, the movable member 15 of fuel injector 11 is actuated by the pressure of the fuel to be injected and is moved thereby in an upward direction, as viewing FIG. 2, to inject fuel into cylinder No. 1. Upon the initiation of movement of the movable member 15 of fuel injector 11, the corresponding normally closed electrical contacts provided by movable valve member 16 and accommodating valve seat 17 are operated to the electrical circuit open condition. Upon the operation of these normally closed electrical contacts to the electrical circuit open condition, an electrical signal of a positive polarity upon junction 40, FIG. 1, with respect to point of reference or ground potential 5 appears upon output lead 41. This electrical signal is applied to the corresponding input terminal of four input OR gate 30. In response to this positive polarity logic 1 input signal, OR gate 30 produces a positive polarity logic 1 output signal which is applied to the input terminal of delay circuit 50. After a predetermined delay period, delay circuit 50 produces a logic 1 output signal which is applied to the "R" input terminal of RS flip-flop circuit 45. At this time, the signal cycle being induced in pickup coil 82 is in the negative polarity excursion, consequently, a logic 0 signal is present upon the "S" input terminal of RS flip-flop circuit 45. This device, therefore, produces a logic 0 signal upon the "Q" output terminal thereof, a condition which places junction 53 at substantially ground potential. At the moment diode 60 becomes forward biased by the substantially ground potential upon junction 53, forward biased diode 60 and the output transistor of the "Q" output terminal of RS flip-flop circuit 45 divert base-emitter drive current from NPN transistor 61 to extinguish this device. With NPN transistor 61 not conducting, base-emitter drive current is supplied to NPN transistor 62 through resistors 72 and 73 in the proper polarity relationship to produce base-emitter drive current through an NPN transistor, consequently, transistor 62 conducts through the collector-emitter electrodes. Conducting transistor 62 diverts base-emitter drive current from NPN transistor 63, consequently, transistor 63 extinguishes. When transistor 63 extinguishes, base-emitter drive current is no longer supplied to NPN switching transistor 64, consequently, switching transistor 64 extinguishes to abruptly interrupt the ignition coil primary winding 57 energizing circuit previously described. Upon this abrupt interruption of the primary winding 57 energizing circuit, an ignition spark-creating potential is induced in secondary winding 58 by the resulting collapsing magnetic field in a manner well-known in the art. This ignition spark-creating potential is directed to spark plug 1S of cylinder No. 1 of engine 10 into which fuel is being injected by fuel injector 11 through lead 74, distributor rotor 3, rotated in timed relationship with engine 10 by engine 10 in a manner well-known in the art, distributor output terminal 4a and lead 77.

The ignition coil primary winding energizing circuit remains interrupted until the occurrence of the positive polarity excursion of the next alternating current signal cycle induced in pickup coil 82. At that time, the ignition coil primary winding energizing circuit is again established in the manner hereinabove explained.

The sequence of events just described is repeated sequentially for the remaining cylinders of engine 10, the complete cycle of all four cylinders of engine 10 being repeated so long as engine 10 remains in the "Run" mode.

From the foregoing description, it is apparent that the ignition system of this invention is responsive to an electrical signal produced upon the initiation of actuation of any of the fuel injectors of engine 10 to inject fuel into the corresponding cylinder to produce an ignition spark-creating potential which strikes an ignition arc across the spark plug of the cylinder of the engine 10 next to be fired at substantially the precise moment the injected fuel arrives in the vicinity of the spark plug.

While the ignition system of this invention has been described with reference to a four cylinder, direct fuel injected-spark ignited internal combustion engine, it is to be specifically understood that this ignition system may also be employed with other type fuel injected-spark ignited internal combustion engines without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An ignition system for use with direct fuel injected spark ignited internal combustion engines of the type having a spark igniting device for each cylinder thereof, comprising: a fuel injector having a valve seat and a cooperating movable valve member corresponding to each cylinder of an associated internal combustion engine for injecting fuel into the combustion chamber of the said cylinder to which it corresponds when said movable member is actuated, said valve seat and cooperating movable valve member providing a pair of normally closed electrical contacts which are operated to the electrical circuit open condition upon the initiation of actuation of said movable valve member to inject fuel; means including said pair of normally closed contacts for producing an electrical signal corresponding to each said fuel injector upon the operation of said pair of normally closed electrical contacts thereof to the electrical circuit open condition; circuit means including delay circuit means responsive to each of said electrical signals for producing an ignition spark creating voltage; and means for directing said ignition spark creating voltage to the said spark igniting device of the said cylinder of said engine into which fuel is being injected.

2. An ignition system for use with direct fuel injected spark ignited internal combustion engines of the type having a spark igniting device for each cylinder thereof, comprising: a source of direct current potential; a fuel injector having a valve seat and a cooperating movable valve member corresponding to each cylinder of an associated internal combustion engine for injecting fuel into the combustion chamber of the said cylinder to which it corresponds when said movable member is actuated, said valve seat and cooperating movable valve member providing a pair of normally closed electrical contacts which are operated to the electrical circuit open condition upon the initiation of actuation of said movable valbe member to inject fuel; an ignition system for sequentially energizing said spark igniting devices; an electrical circuit including at least said source to direct current potential and said pair of normally closed electrical contacts in series corresponding to each said fuel injector; delay circuit means and means for interconnecting each of said electrical circuits and said delay circuit means with said ignition system in such a manner that a respective said spark igniting device is energized by an ignition spark creating voltage at the expiration of the time delay period introduced by said delay circuit means after the operation of said normally closed electrical contacts of the corresponding said fuel injector to the electrical circuit open condition when fuel is injected into the combustion chamber of the engine to which said fuel injector corresponds.

3. An ignition system for use with direct fuel injected spark ignited internal combustion engines of the type having a spark igniting device for each cylinder thereof, comprising: a source of direct current potential; a fuel injector having a valve seat and a cooperating movable valve member corresponding to each cylinder of an associated internal combustion engine for injecting fuel into the combustion chamber of the said cylinder to which it corresponds when said movable member is actuated, said valve seat an cooperating movable valve member providing a pair of normally closed electrical contacts which are operated to the electrical circuit open condition upon the initiation of actuation of said movable valve member to inject fuel; an electrical circuit including at least said source of direct current potential and said pair of normally closed electrical contacts in series corresponding to each said fuel injector for producing an electrical signal of a selected polarity upon the operation of said pair of normally closed electrical contacts to the electrical circuit open condition; circuit means including delay circuit means responsive to each of said electrical signals for producing an ignition spark creating voltage; and means for directing said ignition spark creating voltage to the said spark igniting device of the said cylinder of said engine into which fuel is being injected.

4. An ignition system for use with direct fuel injected spark ignited internal combustion engines of the type having a spark igniting device for each cylinder thereof, comprising: a source of direct current potential; a fuel injector having a valve seat and a cooperating movable valve member corresponding to each cylinder of an associated internal combustion engine for injecting fuel into the combustion chamber of the said cylinder to which it corresponds when said movable member is actuated, said valve seat and cooperating movable valve member providing a pair of normally closed electrical contacts which are operated to the electrical circuit open condition upon the initiation of actuation of said movable valve member to inject fuel; a resistor corresponding to each of said fuel injectors; an electrical circuit for each said fuel injector including the series combination of said pair of normally closed electrical contacts, the corresponding said resistor and said source of direct current potential for producing an electrical signal of a selected polarity upon the operation of said pair of normally closed electrical contacts to the electrical circuit open condition; circuit means including delay circuit means responsive to each of said electrical signals for producing an ignition spark creating voltage; and means for directing said ignition spark creating voltage to the said spark igniting device of the said cylinder of said engine into which fuel is being injected.

* * * * *

UNITED STATES PATENT AND TRADEMARK OFFICE
CERTIFICATE OF CORRECTION

PATENT NO. : 4,111,178
DATED : September 5, 1978
INVENTOR(S) : Gary L. Casey

It is certified that error appears in the above-identified patent and that said Letters Patent are hereby corrected as shown below:

Column 1, line 50, "combustion" should read -- combustible --.
Column 8, line 66, "valbe" should read -- valve --; line 68, "to" should read -- of --.
Column 9, line 23, "an" should read -- and --.

Signed and Sealed this

Twentieth Day of March 1979

[SEAL]

Attest:

RUTH C. MASON
Attesting Officer

DONALD W. BANNER
Commissioner of Patents and Trademarks